Oct. 28, 1952      W. E. HOFFMAN      2,615,515
WINDOW SCREEN FOR AUTOMOBILES
Filed Oct. 26, 1951
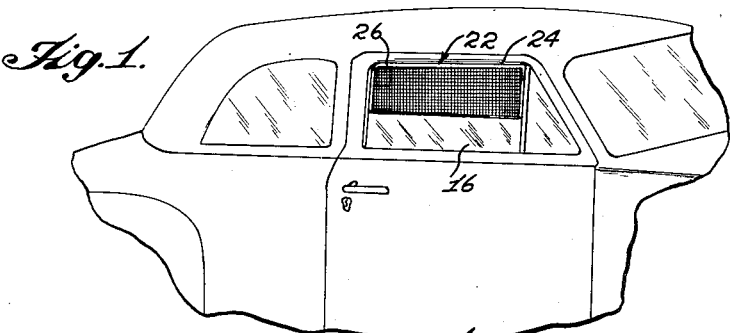
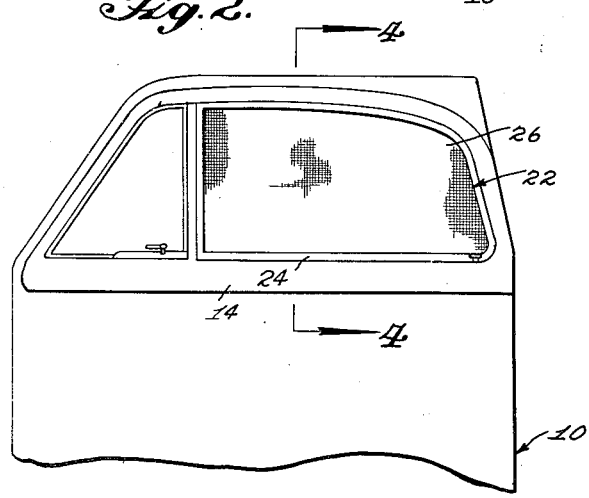
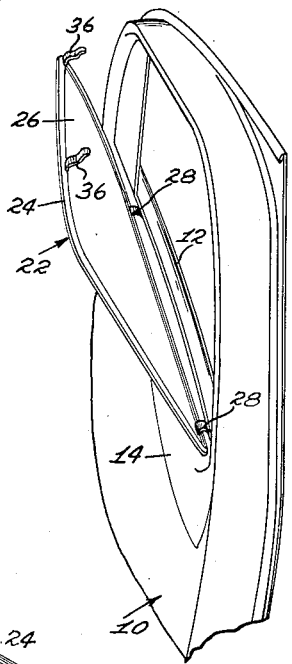
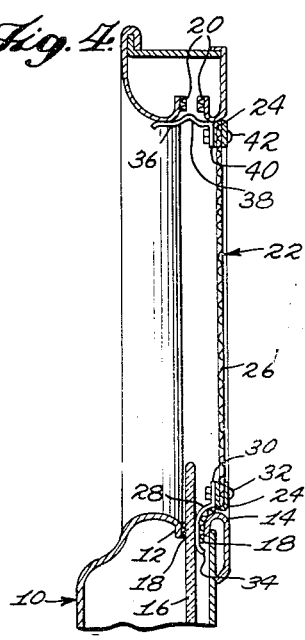
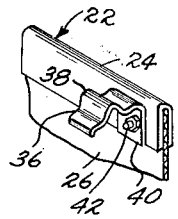
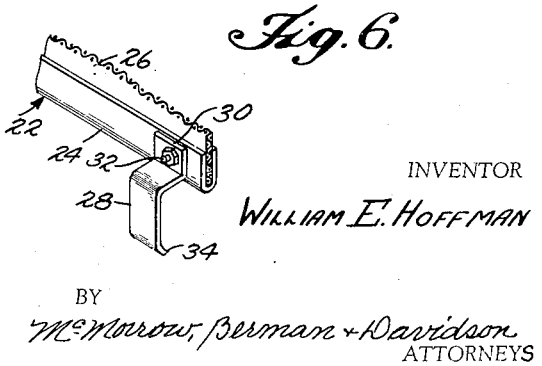
INVENTOR
WILLIAM E. HOFFMAN
BY
McMorrow, Berman & Davidson
ATTORNEYS Patented Oct. 28, 1952

2,615,515

UNITED STATES PATENT OFFICE 2,615,515

WINDOW SCREEN FOR AUTOMOBILES

William E. Hoffman, North Sacramento, Calif.

Application October 26, 1951, Serial No. 253,234

3 Claims. (Cl. 160—369)

This invention relates to a window screen adapted for application to the windows of passenger automobiles of present day design.

During the operation of a passenger automobile in warm weather, the necessity of keeping the windows lowered to assure proper ventilation often results in insects or dirt entering the windows, to the annoyance of the occupants of the vehicle.

Accordingly, it is the main object of the present invention to provide an improved window screen for automobiles, that can be applicable with facility to conventionally designed automobile windows in a matter of minutes, thus to screen the window opening against the admission of insects and the like.

Another important object is to provide a window screen for automobiles which can be manufactured at low cost, and which can be readily removed whenever desired.

Still another important object is to provide a window screen as stated which will not interfere with normal raising and lowering of the automobile window and which will be disposed interiorly of the automobile vehicle when the window is raised, thus to prevent the window screen from being stolen or accidentally lost.

Still another important object is to provide a window screen as stated which will be of very low cost, considering the benefits to be obtained thereby, but which will nevertheless be attractive and will not detract in any way from the appearance of the vehicle.

Other objects will appear from the following description, the claims appended thereto, and from the annexed drawing, in which like reference characters designate like parts throughout the several views, and wherein:

Figure 1 is a fragmentary perspective view of an automobile in which a window screen formed in accordance with the present invention is mounted;

Figure 2 is an enlarged fragmentary elevational view of the automobile door as seen from the inside of the vehicle;

Figure 3 is a fragmentary perspective view of said door, the screen being illustrated as it appears when being inserted in place or when being removed from the door;

Figure 4 is an enlarged sectional view taken on line 4—4 of Figure 2;

Figure 5 is a fragmentary perspective view of the upper portion of the window screen showing the upper bracket embodied in the structure; and Figure 6 is a view similar to Figure 5 but showing the lower portion of the window screen, so as to provide a detailed view of a lower bracket or support embodied in the construction.

The reference numeral 10 designates generally the door of an automotive vehicle of present day design, formed with the window opening 12. An interior garnish mold 14 is mounted upon the door, and extends peripherally of said opening, so as to provide a well receiving the pane 16 of the window. Felt strips 18 are applied at opposite sides of the well, so as to cushion the pane 16 and prevent undesirable vibration during operation of the vehicle.

Upper felt strips 20 are provided in the channel at the upper end of the window opening, and cooperate with the lower strips 18 in preventing vibration of the panes 16.

All this is conventional construction, and does not per se constitute any part of the present invention.

In accordance with the present invention, a window screen generally designated 22 is provided, that includes a peripheral binding strip 24 of U-shaped cross sectional configuration, the binding strip being conformed to the general shape of the window opening, as may be readily noted from Figures 1 or 2.

The binding strip 24 is clamped or otherwise secured to the marginal area of a screen member 26, so as to reinforce said screen member and hold the screen member taut when the window screen is mounted in proper position in the automobile door.

I provide a support for the window screen, at the lower end of said screen, and to this end spaced brackets 28 are utilized, said brackets being of identical formation. Each bracket may be formed from a suitable length of flat bar stock, bent or otherwise formed to shape, so as to provide on each bracket an inverted L-shaped lower portion which extends into the window receiving well of the door, as may be readily noted from Figure 4.

By reason of the inverted L-shape imparted to the respective brackets 28, the screen member 26 will be offset inwardly of the pane-receiving well, as may be seen from Figure 4, so that the entire screen member is disposed interiorly of the pane when the window of the vehicle is raised. As a result, a safeguard is afforded against the screen being stolen.

As will be seen from Figure 4, the bracket 28 is so proportioned as to thickness as to fit snugly between one of the lower felt strips 18 and the pane 16. In this connection, if desired the bracket itself can be provided with felt strips on either side thereof, so as to prevent vibration of the pane 16 and, for that matter, vibration of the window screen itself.

Formed upon the upper end of each bracket 28 is an upstanding leg 30 adapted to receive screws or other fastening elements 32, that pass through the lower portion of the binding strip 24, so as to secure the bracket 28 fixedly to said binding strip.

At the free ends of the bracket, inturned lips 34 can be formed, so as to prevent accidental removal of the brackets from the window receiving well of the car door.

Referring to Figure 5, I provide spaced upper brackets 36, each of which is provided with a lateral extension at one end, that extends transversely of and projects beyond the window receiving channel of the car door, the medial portion of the lateral extension of each upper bracket being offset upwardly, where said bracket crosses the window channel. As a result, the upwardly offset medial portion of each upper bracket extends partially into the upper channel of the window opening, so that when the pane 16 is raised, it will bind against the upper bracket within the upper channel of the car door, thus to securely hold the car screen in place, while still being movable to a closed position.

Of course, when the pane 16 is lowered, the upper brackets will still hold the window screen in place, since said brackets are of springable material, and exert a continuous yielding pressure upwardly against the top portion of the automobile door.

The upper brackets 36 are formed with depending legs 40, that are positioned against the upper portions of the binding strips 24, and are fixedly secured to said binding strip by means of screws 42 or equivalent fastening elements.

It will be readily appreciated that the window screen can be applied to a conventional automobile window with considerable facility, since it is merely necessary that the lower brackets be hooked into the lower channel of the window opening in the manner illustrated in Figure 3. Thereafter, the screen is swung upwardly to the position illustrated in Figure 4, and when so swung, will engage the upper portion of the automobile door, by reason of the upper brackets 36.

Thereafter, the window screen will effectively prevent the entry of insects or other undesired objects into the vehicle interior, and further, the screen will not interfere in any way with the normal operation of the automobile window. Thus, in Figure 1, the automobile window has been illustrated in partially raised position, this being entirely possible without interference from the window screen constituting the present invention.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. A window screen for automobiles including a screen member extendable over the full area of the window opening of an automotive vehicle; a binding strip engaging the peripheral portion of said screen member; and upper and lower brackets extending laterally from said binding strip and rigidly secured to the binding strip, said brackets releasably engaging the upper and lower edges of said window opening to removably mount the screen in said opening.

2. A window screen for automobiles including a screen member extendable over the full area of an automotive vehicle window opening having a pane-receiving well communicating therewith through the upper and lower edges of said opening; a binding strip engaging the peripheral portion of the screen member to reinforce the same; lower brackets secured to said binding strip and extending laterally and downwardly therefrom, for engagement in said well at the lower edge of the automotive vehicle window opening; and upper brackets secured to the upper portion of said binding strip and extending laterally from the binding strip, said upper brackets being of springable material and being adapted to grip the upper edge of the opening of the vehicle window.

3. A window screen for automotive vehicles comprising a screen member extendable over substantially the full area of an automotive vehicle window opening having a pane-receiving well communicating therewith through the upper and lower edges of the opening; a binding strip of U-shaped cross sectional configuration extending through the full periphery of and engaged with the screen member to reinforce the same; spaced lower brackets secured fixedly at one end to the lower portion of said binding strip, said brackets extending laterally and downwardly from the binding strip and being engageable in said well at the lower edge of the automotive vehicle window opening, thus to space the lower portion of the window screen laterally of said well; spaced upper brackets extending laterally from the binding strip at the upper end of the window screen, said upper brackets being of springable material and being deformed intermediate opposite ends thereof to extend partially into the pane-receiving well at the upper edge of said opening, said upper brackets spacing the upper portion of the window screen laterally of said well; and means fixedly securing the upper brackets to the binding strip at the upper end of said window screen.

WILLIAM E. HOFFMAN.

REFERENCES CITED

The following references are of record in the file of this patent:

UNITED STATES PATENTS

| Number | Name | Date |
|---|---|---|
| 1,273,221 | Higgin | July 23, 1918 |
| 2,026,830 | Oakley | Jan. 7, 1936 |
| 2,033,734 | Everhard | Mar. 10, 1936 |
| 2,476,901 | Oppatt | July 19, 1941 |